Feb. 20, 1934.    J. L. ADAMS, JR    1,948,154
APPARATUS FOR WELDING
Filed Nov. 11, 1930    7 Sheets-Sheet 1
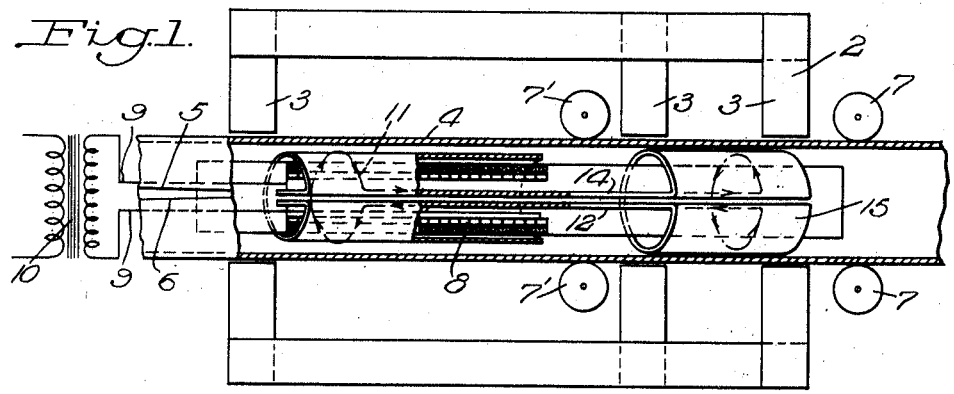
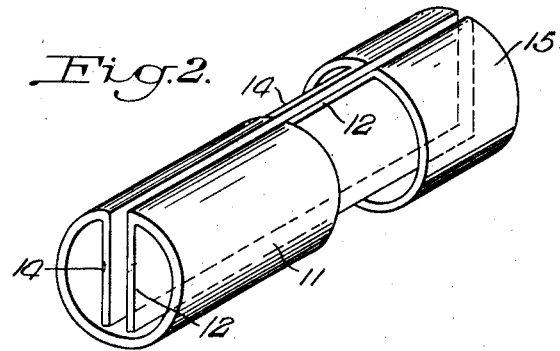
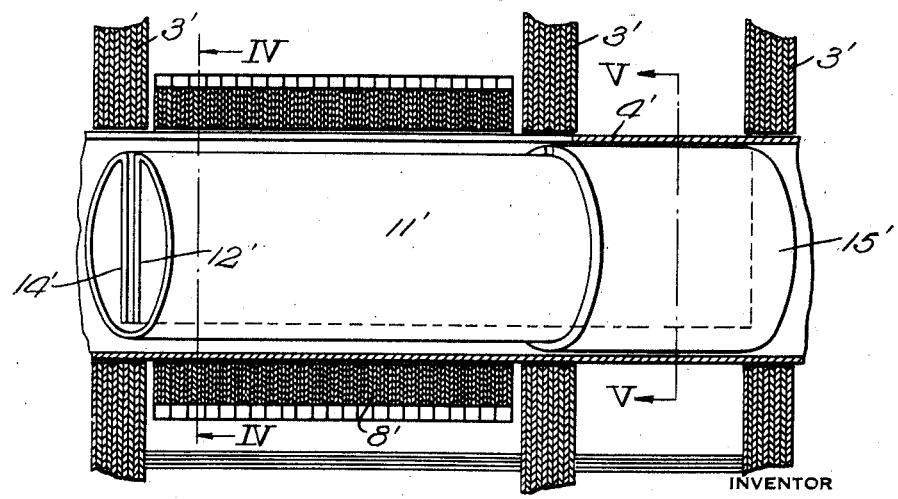
INVENTOR

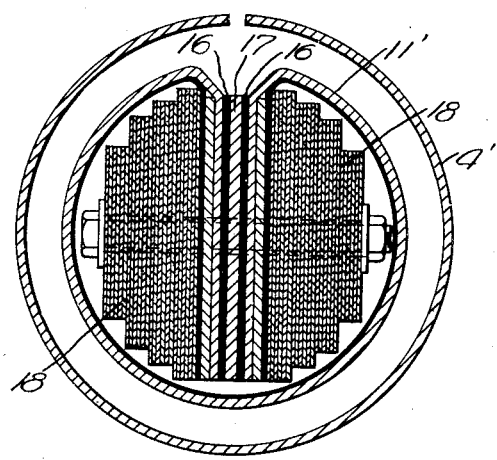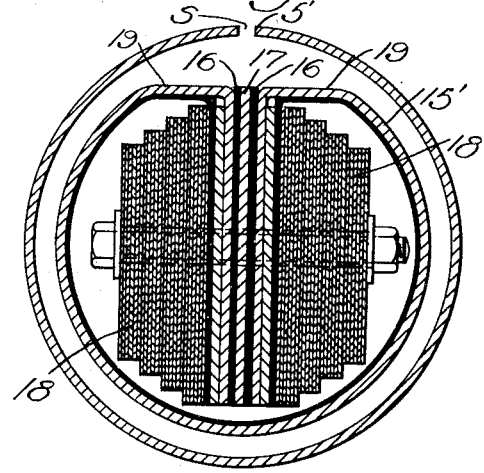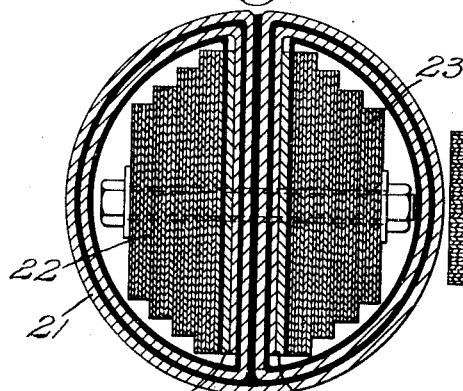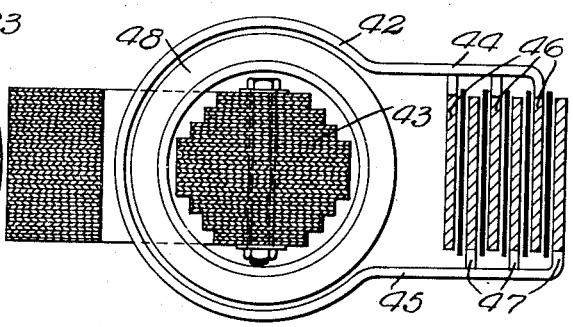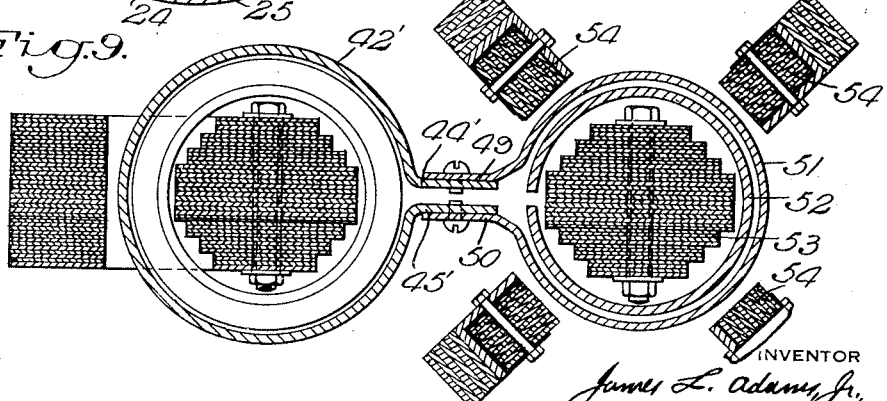

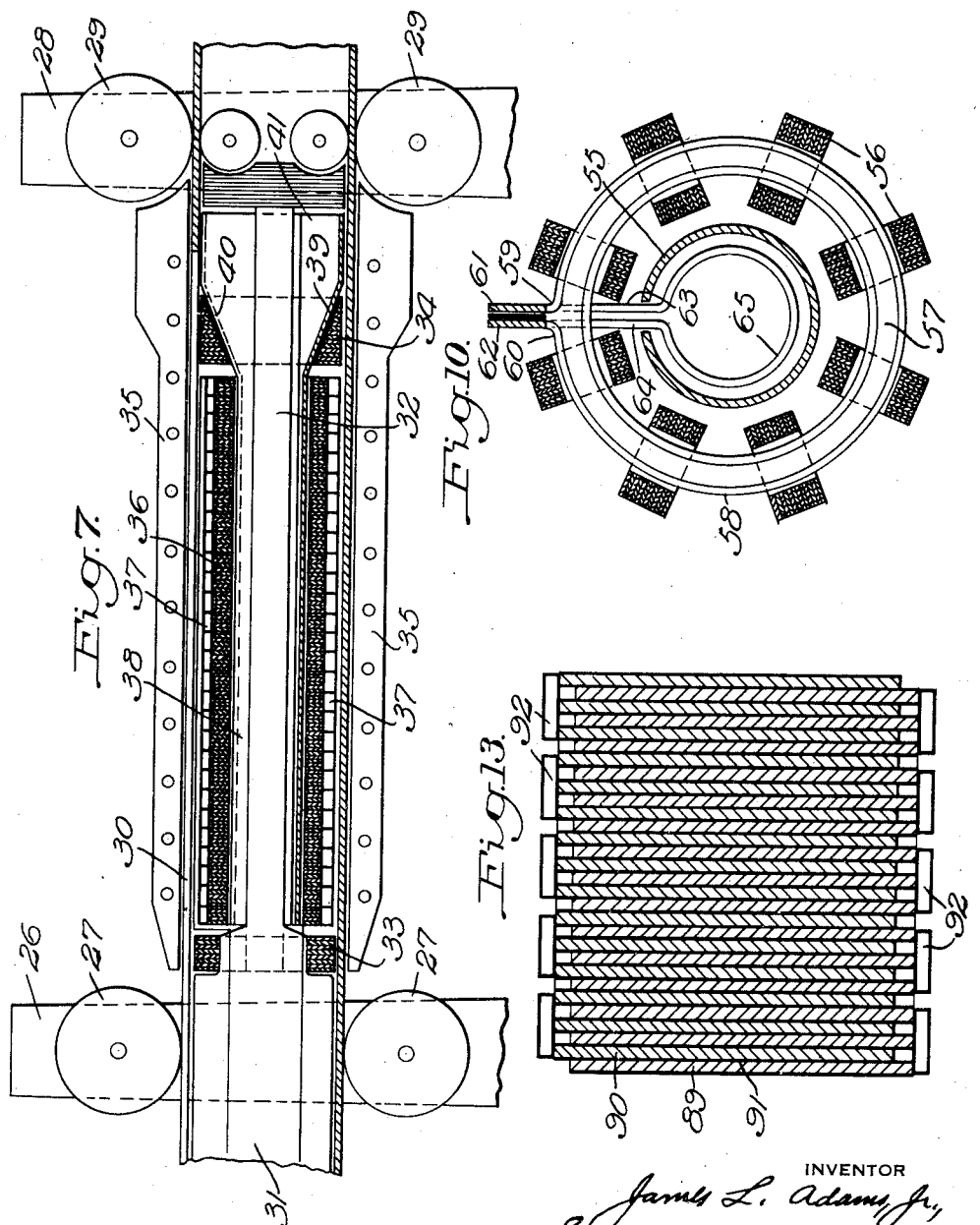

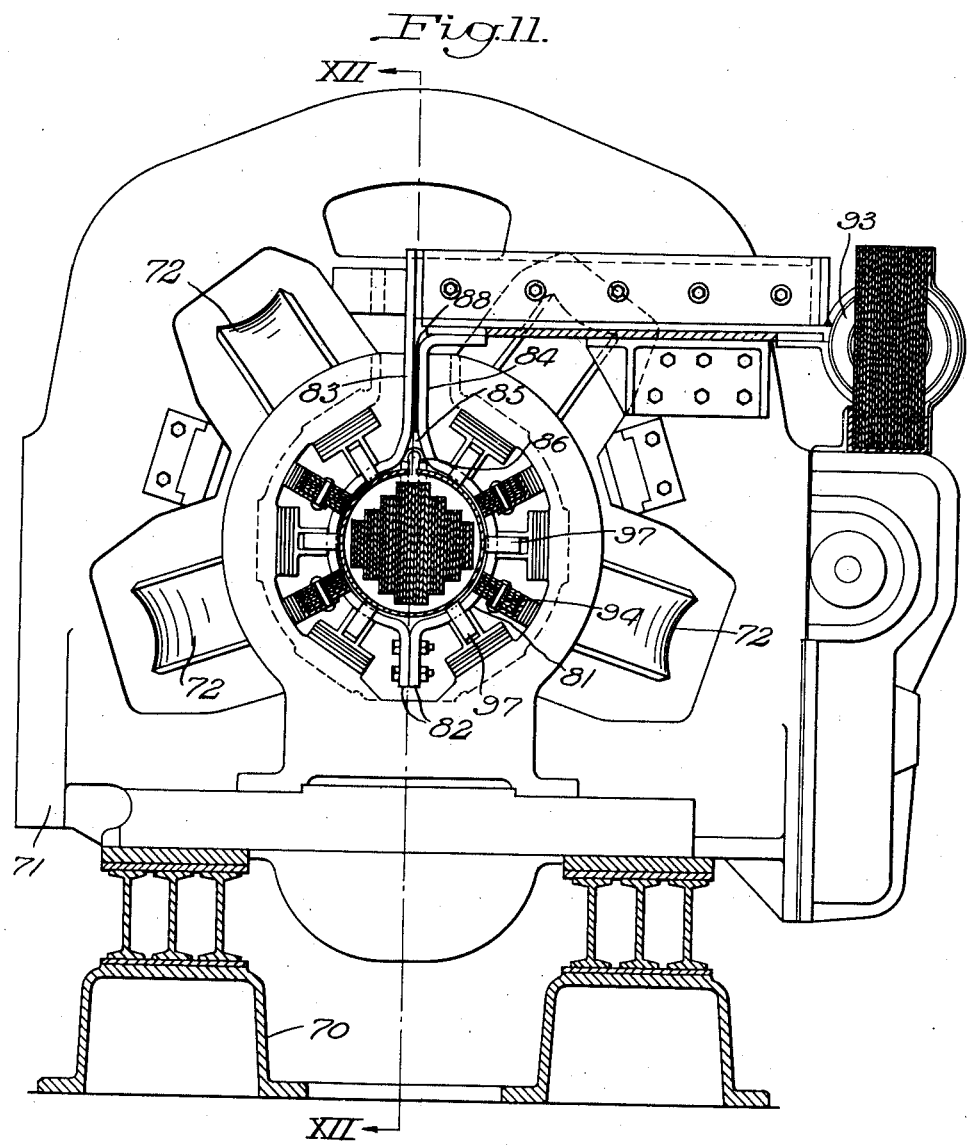

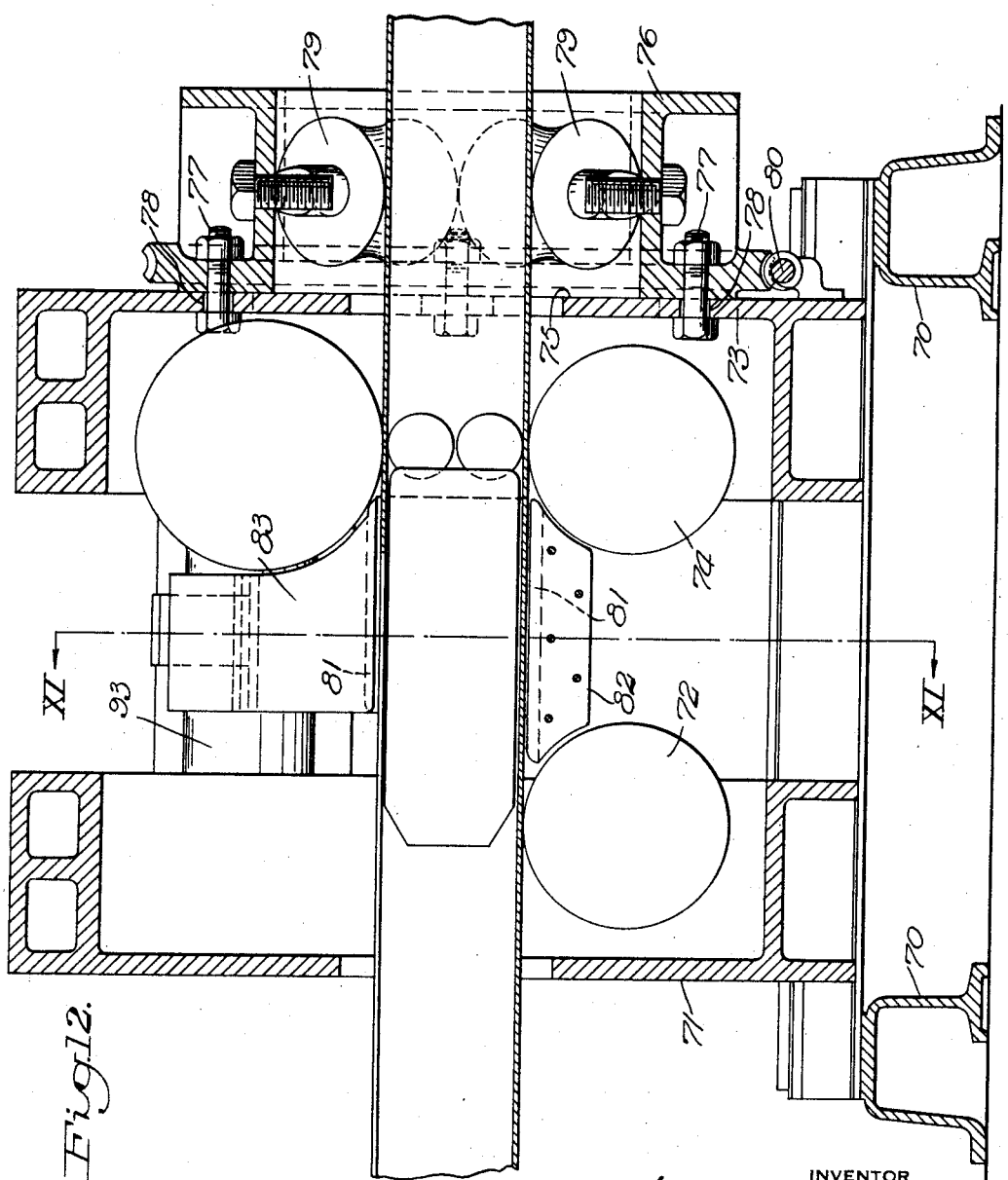

Feb. 20, 1934.                J. L. ADAMS, JR                1,948,154
                            APPARATUS FOR WELDING
                          Filed Nov. 11, 1930          7 Sheets-Sheet 6
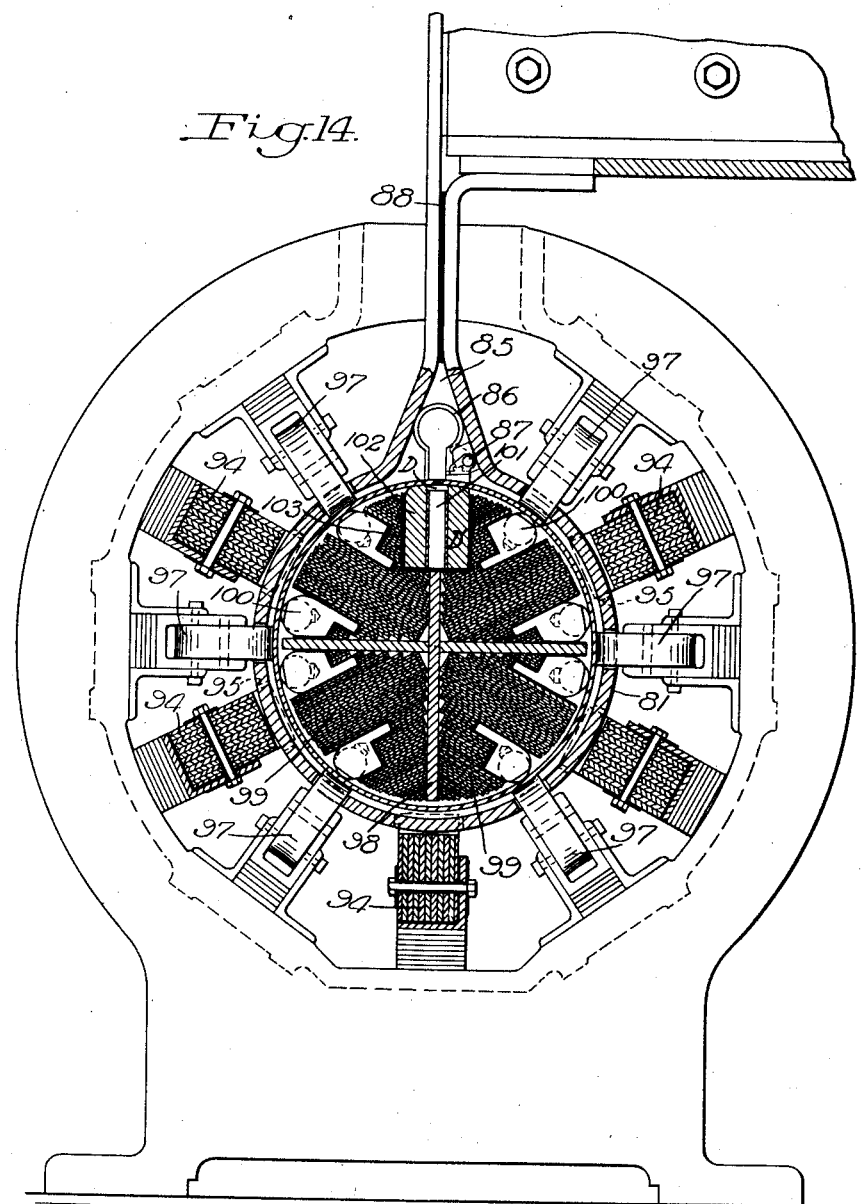
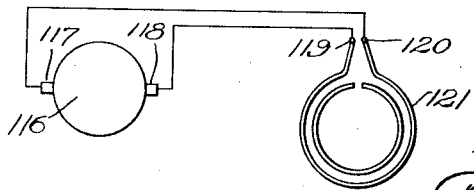
INVENTOR Feb. 20, 1934.    J. L. ADAMS, JR    1,948,154
APPARATUS FOR WELDING
Filed Nov. 11, 1930    7 Sheets-Sheet 7
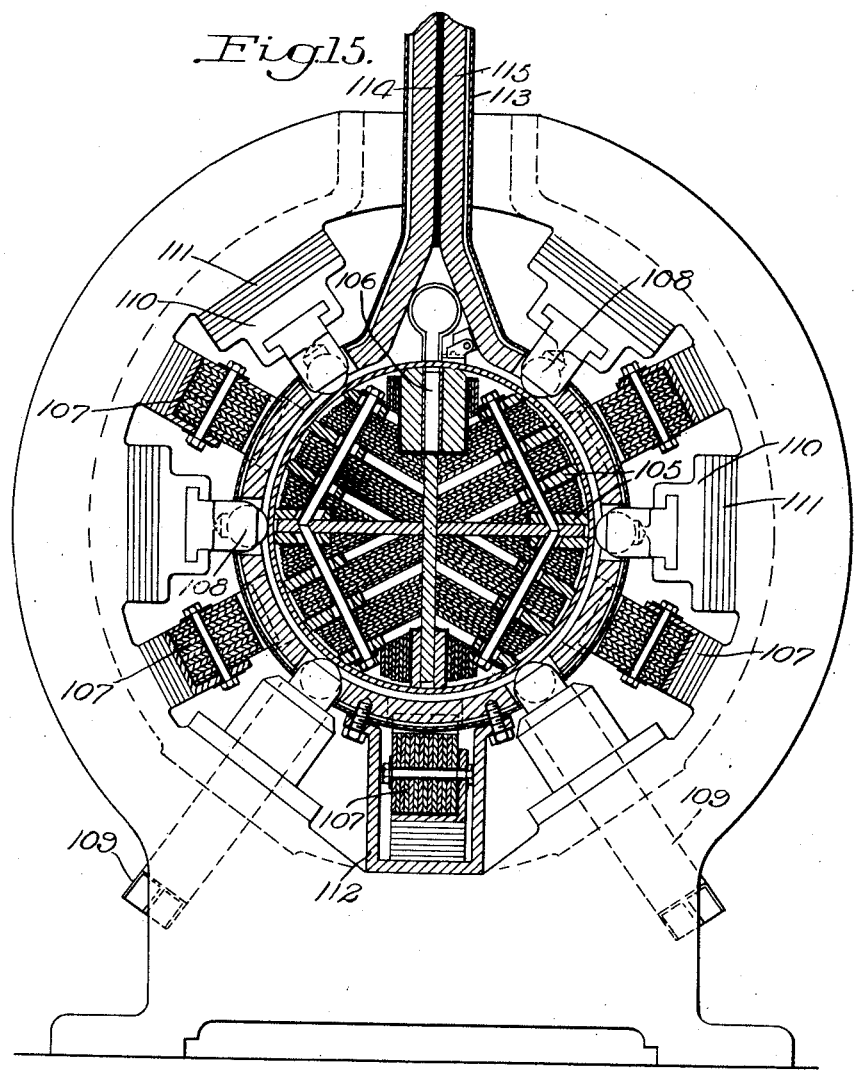
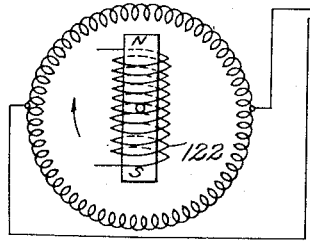

Patented Feb. 20, 1934

1,948,154

UNITED STATES PATENT OFFICE 1,948,154

APPARATUS FOR WELDING

James L. Adams, Jr., Youngstown, Ohio, assignor to The Youngstown Sheet & Tube Company, Youngstown, Ohio, a corporation of Ohio Application November 11, 1930
Serial No. 494,905

20 Claims. (Cl. 219—6)

The present invention relates to the problem of electrically welding substantially tubular material by means of the continuous induction system of welding. The invention while particularly applicable to the formation of tubes and pipes, is also applicable to any substantially tubular material in which the configuration is such that the edges of the piece or pieces forming the article are brought into such relationship that a weld may be produced therebetween. Thus the article may be substantially truly circular or may vary from a circular cross section to a rectangular, triangular, polygonal or oval cross section, all of which shapes are herein included within the general term "substantially tubular articles". It will be understood therefore that this expression is used as an expression of definition and not one of limitation.

The induction welding of articles of the general character herein contemplated has heretofore involved a number of difficulties. These difficulties have arisen, to a large extent, by reason of the fact that in order to effectively weld material by the induction method it is desirable, and from an economical and practical standpoint essential, that the coil or coil structures by means of which the required current flow is induced in the material be located as closely adjacent thereto as possible.

To those skilled in the art it will be apparent that as the coil structure approaches the material in which the current flow is being induced, and thereby decreases the air space between the coil structure and the material, the air path for magnetic leakage is correspondingly reduced. It will likewise be apparent that such a relationship, while highly desirable for electrical reasons, is disadvantageous for mechanical reasons. It materially increases the problems of coil cooling and coil insulation, since the coil is in parts directly exposed to the intense heat produced in the material by the induced current, and especially along the seam in such material, which heat will be sufficient to bring the edge portions of the material to, or substantially to, the desired welding temperature.

As heretofore practiced, the coil structure constituting a primary, not only had to satisfy requirements of the nature indicated, but had to be such as to carry a current of from 3,000 to 5,000 amperes at a voltage of from 650 to 900 volts. Where the material being welded has constituted a movable secondary for such primary, the material has had induced therein a current of from 120,000 to 200,000 amperes with a potential difference of from 15 to 20 volts across the gap between the edges being welded. Such current flows in the material have necessarily caused great heat in the primary, especially in those parts near the cross seam current path, which heat has had to be satisfactorily carried away in addition to the heat produced by the inducing current in the primary itself. This has obviously required an efficient water cooling system, which at the same time has had to be extremely compact. The two problems thus presented obviously more or less directly oppose each other in their solution, with the result that the structure provided has necessarily involved more or less of a compromise.

The present invention contemplates broadly a primary coil generally similar to the coil structure before referred to, but characterized by a materially increased size, if desirable, and by the possibility of being located at any desired moderate distance, away from the welding zone. In this manner the size of the coil, of the water cooling means, and of the insulation may be increased to satisfactorily meet the requirements to which the parts are subjected. For transferring the electrical effect of such a primary located relatively remotely to the welding zone, itself, there is provided a true secondary for the primary coil of such construction as to have a low voltage, high amperage current produced therein. This current is then conducted from the secondary to a suitable tertiary coil structure which is placed in the same relative position with respect to the material being welded as that occupied heretofore by the primary coil itself. Such tertiary coil structure may have a construction generally similar to that of the secondary, except usually shorter longitudinally, and may be placed either close to the inside circumferential surface of the tubular material, or close to the outside circumferential surface, or both, and preferably located in every case as far toward the welding zone as constructional limitations will permit. Such tertiary coil in turn induces a more or less circumferential belt of welding current in the tubular material, which material thus acts as a quaternary or second secondary.

In accordance with the present invention the various difficulties heretofore encountered are obviated while enabling the desired current flow to be efficiently induced in the material being welded, by an axially ultra short inducing coil system, located very close indeed to the actual welding zone, and also very close to the pipe surface.

In the accompanying drawings there are illustrated more or less diagrammatically different embodiments by means of which the advantages of the present invention may be effectively realized. In the drawings:

Figure 1 is a partial longitudinal view through one form of a welding apparatus constructed in accordance with the present invention;

Figure 2 is a perspective view of a portion of the apparatus illustrated in Figure 1;

Figure 3 is a view similar to Figure 1 but illustrating the primary coil as disposed outside of the material being welded;

Figure 4 is a transverse sectional view on the line IV—IV of Figure 3, looking in the direction of the arrows;

Figure 5 is a transverse sectional view on the line V—V of Figure 3, looking in the direction of the arrows;

Figure 6 is a view similar to Figure 4, but illustrating a slightly modified form of secondary coil construction;

Figure 7 is a view similar to Figure 3 illustrating another embodiment of the invention;

Figure 8 is a diagrammatic sectional view illustrating a modified form of primary and secondary coil construction in which both the primary and secondary are located exteriorly of the material being welded;

Figure 9 is a view similar to Figure 8, but illustrating a slightly modified embodiment of the invention;

Figure 10 is a diagrammatic sectional view illustrating another slightly modified form of primary and secondary in cooperative relation to the material being welded;

Figure 11 is a transverse sectional view on the line XI—XI of Figure 12, looking in the direction of the arrows;

Figure 12 is a longitudinal sectional view on the line XII—XII of Figure 11, looking in the direction of the arrows;

Figure 13 is a vertical sectional view of the electrical connections between the tertiary coil and the transformer of Figures 11 and 12;

Figure 14 is a detail sectional transverse view, on an enlarged scale, of a portion of the apparatus illustrated in Figure 11;

Figure 15 is a view similar to Figure 14 illustrating a slightly modified embodiment of the invention;

Figure 16 is a diagrammatic view illustrating another embodiment of the invention; and Figure 17 is a view similar to Figure 16 showing a further modification.

Referring more particularly to Figures 1 and 2 of the drawings, there is illustrated a magnetic circuit 2 of any desired construction, but preferably laminated for reasons understood in the art. This magnetic circuit is of such construction as to provide pole pieces 3 adapted to receive therebetween the material 4 being welded. This material is herein illustrated as of substantially truly cylindrical contour, to which contour it may be preformed in any desired manner. As so preformed, however, the adjacent edges 5 and 6 are in slightly spaced relationship. As the material is fed forwardly through the magnetic circuit, it may be subjected to pressure applying means of any desired type and located at such point or points as to gradually close up the space between the edges, with the result that such edges come together in substantially the form of a long V. In Figure 1, I have illustrated such pressure applying means comprising welding rolls 7, the particular location of which constitutes no part of the present invention. Their adjustment, however, will preferably be such that the apex of the V just referred to will lie substantially opposite, although preferably somewhat to the right of the intermediate pole pieces 3 of the magnetic circuit shown, although it may lie at a point substantially displaced therefrom in one direction or the other. In addition to the welding rolls 7, I may also provide at any desired point or points supplementary shaping, crushing or regulating rolls 7'.

Cooperating with the magnetic circuit is a primary coil 8 of the welder system proper having leads 9 therefrom connected to the secondary of a suitable regulating transformer 10, which may be of any usual construction and effective for example for delivering to the primary coil 8 a current of from 3000 to 5000 amperes the voltages ranging from 650 to 900 volts. Cooperating with the primary coil 8 is an axially long, single turn cylindrical secondary coil 11, herein illustrated diagrammatically, and shown as having leads 12 and 14 extending therefrom to an axially long, single turn tertiary coil 15, also illustrated diagrammatically as lying within, very close to, and substantially concentric to the material 4 being welded.

In Figure 2 the secondary coil 11 is illustrated in perspective with the leads therefrom to the tertiary coil 15 in the form of parallelly extending bus-bars of appreciable cross sectional area, whereby the heating effect of the current carried thereby is minimized.

With a construction of the character referred to the primary coil 8 and the secondary coil 11 are located in advance of the principal cross seam heating zone, which zone in the embodiment illustrated may be considered as lying between the intermediate poles 3 and the right hand portion of the magnetic circuit and therefore in such a position as not to be directly subjected to the intense heat generated in the material by the cross seam current flow induced therein. The arrows in Figure 1 are indicative of the simultaneous and instantaneous current flows at one given instant, in the respective parts. With such a construction, the primary and secondary coils may both be made relatively long axially so as to suitably meet the requirements imposed thereon, since only the single turn tertiary is subjected to the intense heat of the heating zone. Being practically devoid of insulation, it can successfully withstand from three to five times the temperature rise of a multi-turn, high voltage, insulated primary, and therefore about double the ampere loadings of the latter, for a given copper section. While I have herein not illustrated water cooling means for either the secondary or the tertiary coil, it will be apparent that suitable water cooling means therefore may be provided if desired.

In Figure 3 I have shown a slightly modified embodiment of the invention in which parts corresponding to the parts just described are designated by the same reference characters having a prime affixed thereto. This embodiment of the invention differs principally from that just described in that the primary coil 8' is located outside of and around the material 4' being welded, the coil preferably surrounding such material in a zone in which the seam edges are still spaced an appreciable amount. By reason of this construction, while the material itself will constitute a partial secondary, and therefore have some current flow induced therein, by far the principal secondary current flow will be induced in the single long turn secondary 11' and carried by the bus-bars 12' and 14' to the axially relatively shorter single turn tertiary coil 15'. By making the inside tertiary coil relatively short axially, but extremely close to the pipe surface the heating effect in the cross seam pipe heating zone can be concentrated and intensified, and since the axial component of the current flow through the pipe and to the cross seam path is also very much shortened by a short coil system, the pipe reactance is very markedly decreased also, this leading to still further increases in the final cross seam current flow, and the resultant seam heating.

In Figure 4 the secondary 11' is shown as carried by insulation 16 secured to a stiffening plate 17, and as having a laminated core structure 18 cooperating therewith.

In Figure 5 the tertiary coil 15', which will connect with 11' of Figure 4 through the bus-bars 12' and 14', is illustrated as being similarly carried from a central stiffening plate 17 through the medium of insulation 16, and as being formed around laminations 18. It will be apparent that the stiffening plate, insulation and laminations may extend continuously, if desired, throughout the length of the secondary and tertiary coil. In this figure also the tertiary coil is shown as having substantially flat portions 19 adjacent the seam S, whereby slightly greater space is provided between this portion of the tertiary coil and the material than exists between the remaining circumferential portions of each, so as to give added protection from the intense heat of the welding seam, and yet keep most of the coil circumference just as close as possible to the tube, for the purpose of better magnetic coupling, and therefore higher energy transfer ability.

Such a construction is further desirable to preclude possibility of injury to the apparatus in case of misalignment of same and a possible deflection of one of the edge portions thereof such that the edge 5', illustrated at the right of the seam in Figure 5, should tend to come into contact with the portion of the tertiary shown at the left hand side of the stiffener plate. While the tertiary coil and the material in all substantially radially disposed portions have approximately the same voltage therein, and therefore zero potential difference at each point, nevertheless it is apparent that at this immediately under seam position, there is the full turn voltage to be guarded against, and that engagement of a pipe lip with such portions 19, both at the same instant, might produce some little damage to the copper parts involved. By flat topped construction of the type described, the possibility of such a contact is substantially precluded.

In Figure 6 there is illustrated a slightly modified embodiment of the invention in which the secondary 21 is illustrated as comprising two substantially complete turns about the laminated core 22 and substantially two more complete turns about the laminated core 23, the ends of the coils being connected to bus-bars 24 and 25 for conducting the current induced in the secondary directly to the tertiary coil, such as that in Figure 5, and located axially forward along the pipe, nearer the welding zone.

In Figure 7 there is illustrated a slightly modified form of the invention applied to a welding apparatus of the general type disclosed and claimed in my co-pending application Serial No. 453,888, filed May 20, 1930. In this embodiment of the invention there is shown a crushing or sizing stand 26 carrying crushing or sizing rolls 27, and a welding stand 28 carrying welding rolls 29. The preformed material 30 is first engaged by the crushing and/or sizing rolls 27 and then passes to the welding rolls 29 by means of which the required welding pressure is exerted on the material. Suitably supported by the stand 26 is a torpedo like structure 31 maintained in such position that the material may readily pass thereover. This inner structure terminates at its right hand end portion as viewed in Figure 7 in a laminated core 32 having pole pieces 33 and 34 co-operating with substantially radially extending yokes 35 exteriorly of the material and carried in any desired manner (not shown).

Surrounding the core 32 is an axially very long primary coil 36 herein shown as having water cooling means 37. Located within the primary coil is a similarly long secondary coil 38 functioning in the general manner hereinbefore described and connected through suitable leads 39 and 40 just as in Figure 2, to the ends of an axially very short single turn tertiary coil 41. The tertiary coil is herein illustrated as being of materially greater diameter than the diameter of the secondary 38 whereby it is brought into a position closely adjacent the inner surface periphery of the material being welded.

In Figure 8 there is shown in transverse section another embodiment of a part of the invention in which a single turn secondary coil 42 is shown as surrounding a laminated core 43 and having its ends 44 and 45 connected to a series of low voltage interleaved bus-bars 46 and 47 respectively. These bus-bars may in turn lead to a tertiary coil (not shown), located either interiorly or exteriorly of the material, or both, and in closely adjacent general surface relationship thereto, so as to give very high magnetic coupling. By reason of the arrangement of the bus-bars illustrated, they constitute in effect a portion of the secondary coil 42, in which the desired welding current is induced by the primary coil 48. These bus-bars may in turn lead to a tertiary coil (not shown) located either interiorly or exteriorly of the material being welded and in closely adjacent relationship thereto.

The construction illustrated in Figure 9 is generally similar to that just described, with the exception that the terminals 44 and 45 of the axially long, single-turn secondary coil 42' are directly connected to the terminals 49 and 50 of a short, cylindrical, single-turn tertiary coil 51 herein illustrated as very closely surrounding the material 52 being welded. The material is also shown as lying between an inside core 53 and co-operating outside magnetic yokes 54.

In Figure 10 there is shown a step-down power transformer unit more or less concentrically surrounding the material 55 being welded, and comprising a suitable laminated magnetic circuit 56 with which cooperates a primary coil 57 for inducing a current in the secondary 58, the terminals 59 and 60 of which are connected to bus-bars 61 and 62. These bus-bars are shown as having extensions 63 and 64 to the respective ends of a tertiary coil 65 located within the material 55.

I have heretofore described the principles underlying the present invention in connection with more or less diagrammatic showings thereof, each of which embodiments is, however, adaptable for use in accordance with commercial apparatus depending upon the particular design thereof. The following portion of the specification, however, has to do more especially with certain commercial embodiments for the purpose of further illustrating the flexibility of the invention from the standpoint of operating conditions, and the ease with which the principle may be applied to commercial welding apparatus.

In Figures 11 to 14 both inclusive of the drawings, there is illustrated a welding apparatus including a suitable base 70 on which is mounted a stand 71 adapted to operatively support crushing and sizing rolls 72, and a second stand 73 within which is provided a series of welding rolls 74. The welding roll stand 73 is conveniently of such shape as to provide a substantially flat face 75 adapted to cooperate with a corresponding face on a supplemental crushing stand 76 of the general type disclosed and claimed, for example, in my copending application Serial No. 474,985, filed August 13, 1930. Such supplemental stand is preferably secured to the welding stand by means of bolts 77 extending through slots 78 in the stand 76 and permitting the entire stand with its rolls 79 to be rotated relatively to the stand 75 when the nuts are loosened. Such rotation may be effected in any desired manner as for example by the use of a worm wheel and hand wheel mechanism 80 as herein illustrated.

During the passage of the material through the crushing stand 71 the desired characteristics as to the shape, size and edge precision alinement will be imparted thereto, while upon passage through the welding rolls 74 the heated edges will be brought into engagement with each other under such conditions as to effect a weld. Where the supplemental crushing stand 76 is utilized, the rollers therein may be adjusted to exert additional pressure for finally sizing the pipe and for producing a metal flow at and immediately adjacent each side of the seam such as will be effective for very materially increasing the metal thickness, or insuring the removal of any impurities or foreign particles from the seam proper, by extrusion of the hottest metal and disposing the same in a rib or bead on the material. This rib or bead may be subsequently removed, or permitted to remain at the pleasure of the operator. The rotational adjustment between the roll stands 75 and 76 enables such angular rotation of the supplemental crushing stand as to insure the desired relationship between the rolls therein and the seam being formed.

Intermediate the roll stands 71 and 73 is located a single-turn, short cylindrical type tertiary coil 81 which is herein shown in Figure 11 as comprising semi-cylindrical sections each provided with a projecting flange 82 of conducting material adapted to be bolted or otherwise secured together at a convenient point whereby the insertion and removal of the tertiary is facilitated, the tertiary herein being shown as disposed exteriorly of the material with the sections thereof adjoining each other on substantially a diametrically opposite side of the material from that in which the seam is to be formed. Adjacent opposite sides of the seam the tertiary coil leads 83 and 84 are gradually brought into converging relationship to provide an appreciable space 85 adjacent the seam zone, as best shown in Figures 14 and 15, and yet not make a very large magnetic leakage area here, since if such leakages are made too large, the input to the material will drop. This space not only affords protection to the tertiary coil, but provides a space into which particles ejected by reason of the welding operation may be collected. For this purpose there may be provided a collecting chamber 86 of porcelain or other suitable material adapted to be moved axially into position and to receive such ejected particles. When in position the collector may be held against accidental movement by a suitable catch 87.

Above the space 85 and the collector 86 the leads are brought into adjacent relationship on opposite sides of suitable insulation 88 (Fig. 11), the leads being of such cross sectional characteristics as to effectively carry the desired current values without excessive loss. As illustrated more particularly in Figure 11, the leads 83 and 84 respectively are connected to interleaved bus-bars 89 and 90 (Figure 12), the adjacent bus-bars being of opposite polarity and separated by insulation 91. For cooling the bus-bars, there may be provided any desired system of water cooling ducts 92 suitably secured to the respective bus-bars and connected to a source of cooling water supply. It will be apparent that if desired the water cooling ducts may be continued entirely around the tertiary coil so as to be effective for cooling not only the bus-bars but also the coil itself. At their ends remote from the leads 83 and 84 the bus-bars 89 and 90 are suitably connected to a regulating or other transformer 93 of any desired construction. This transformer is herein shown as supported directly upon and between the stands 71 and 73.

To those skilled in the art it will be apparent that the thin cylindrical type of single turn tertiary coil, such as shown in Figures 11 and 12, for example, may be carried further forward into the heating and welding zone, as indicated in Figure 12, and at the same time much closer, on the average, to the surface metal of the tubular material than any other possible type of external inducing coil of the multi-turn and high voltage type. Since the cylinder is of bare metal with no heat sensitive insulation to protect, much higher ampere loadings can be carried with safety. This means great energy concentration possibilities across the seam at the welding zone, and the ability to utilize a very short axial length of coil to do the work. This in turn means ability to weld up closer to the two ends of each tube length than heretofore, so that the important end scrap loss is reduced materially.

Furthermore, in a conducting cylinder which is unbroken in its axial dimension, the inducing current which it carries is free to shift forward in the axial direction until it more nearly follows the exact path of the induced heating current in the tubular material itself, particularly where the latter is forced to offset forward to the V of the seam position in the welding zone. Allowing the inducing current in the cylinder to follow suit, greatly improves the magnetic coupling between the cylinder and pipe currents, and lowers the inducing coil reactance materially, leading to greater pipe current flow as a result. This again adds to the desired concentration of heating energy at the welding zone position.

To provide the necessary return path for the welder flux, laminated yokes 94 are longitudinally disposed around the material, and as illustrated more particularly in Figures 11 and 14, are made to extend into a position closely adjacent the outer periphery thereof. This may be accomplished by providing the tertiary coil 81 with slots 95 therein, adapted to receive the end or pole piece portions 96 of the yokes, which latter, throughout the intermediate axial portions of their lengths, extend outside of and, in effect, straddle the tertiary coil. If preferred, the slots 95 may be omitted, and the pole piece flux simply allowed to penetrate the thin copper shell of the tertiary coil, increasing the heating loss here to some extent.

For supporting and guiding the material and maintaining it in the desired spaced relationship to the yokes and to the tertiary coil, there may be provided a smaller intermediate stand 97' (Figures 11, 14 and 15) carrying a series of rolls 97 supported in any desired manner and adapted to engage the outer periphery of the material thereby preventing such movement of the material as would bring it into contacting relationship with either the coil or other parts of the apparatus, or serve to destroy the required accurate alinement of the seam edges one with the other.

Within the material there may be provided a core of suitable construction, or a core and an additional inducing coil, (the latter not being shown in Figure 14, but in various forms in preceding figures, such as Figure 10, for example). This core is herein illustrated as comprising carrying and stiffening plates 98 so arranged and disposed as to support laminations 99 adapted to more or less completely fill a predetermined portion of the interior of the tubular material. These laminations in turn may be constructed to support guides 100 effective against the inner surface of the material. While such guiding means may be of any one of a number of different constructions, I have shown the same more particularly in Figure 14 as comprising a series of balls or rolls effective at different points around the inside of the material. The core is also shown as comprising a trough 101 within the core and disposed opposite the collector 36 and directly below the seam. This trough at one end will have a minimum depth as indicated at D in Figure 14 and at the opposite end a maximum depth D', thereby providing an inclined surface over which water may flow adjacent the seam. Preferably the water will flow in the direction in which the material moves whereby the greater body of water is adjacent the hottest seam material, and the water rejected can travel out with the emerging tube.

The trough is herein illustrated as formed by opposed plates 102 constructed of suitable material, such for example as manganese steel suitably insulated from one another and from the trough base by means of insulation 103. These plates 102 may be of such dimensions that the outer edges thereof will constitute guiding means adapted to directly underlie the edge portions of the material.

In Figure 15 there is illustrated a slightly modified form of the invention from that disclosed in Figure 14. In accordance with this form of the invention the inside guiding means 100 are replaced by a series of slides 105 effective at different points around the interior surface of the material being welded, a space being left between the guides adjacent the seam zone of the material for the location of a trough 106 generally similar to that before described. Disposed around the periphery of the material is a series of yokes 107 between which may be located outside guiding means herein illustrated as comprising balls or rollers 108. Certain of these balls are illustrated as carried by adjusting screws 109 whereby they may be moved radially, inwardly or outwardly with respect to the axis of the material. All of the balls may be similarly supported, but I have found that such provision for adjustment of all of the balls is not always essential, it being possible to mount certain of them in brackets 110 carried by shims 111, the addition or removal of the shims giving the flexibility required for different sized pipes, or for adjustment.

For stiffening the tertiary and assisting in maintaining the same in position, there may be provided a bracket 112 adjacent the bottom of the tertiary, the bracket being insulated at the bolts as shown (Fig. 15) and shaped to extend around one of the yokes 107. The water cooling means 113 is herein illustrated as being continued down the tertiary leads 114 and 115 respectively, as before referred to, and carried around the tertiary for effecting the desired cooling thereof. This jacket would of course be welded to the main body of the coil along all edges and around all the smaller openings therethrough, as provided for the balls 108.

To those skilled in the art it will be apparent that the desired current could be supplied to the cylindrical, single-turn inducing coil hereinbefore spoken of as the tertiary coil, whether of single turn construction or of other special construction as herein indicated, by means of a low voltage periodically varying current generator and directly connecting the same to the terminals of the tertiary coil. In Figures 16 and 17, I have diagrammatically illustrated such a system. In Figure 16 there is shown a rotating armature alternating current generator 116, the brushes 117 and 118 of which are electrically connected to the terminals 119 and 120 of the single-turn, low voltage, cylindrical tertiary coil 121.

In Figure 17 there is illustrated an alternating current single phase generator of the type employing a rotating direct current field 122. The output of this generator is likewise directly connected to the terminals 123 and 124 of a tertiary coil 125. The advantage of such a construction over that illustrated in Figure 16, for example, is that it obviates the heavy current carrying brushes required with a rotating armature.

From the foregoing description it will be apparent that the full benefits of the tertiary coil are not limited to any particular form of welding apparatus, to any particular type or construction of cores, yokes, guides, or the like, and that the principle of the invention may be embodied in a wide number of different installations.

In addition to the many advantages of a welding apparatus and a method of welding in accordance with the present invention as hereinafter referred to particularly with respect to manufacturing and operating problems, the invention possesses many other advantages having to do primarily with the electrical conditions existing during the welding operation. An apparatus operating in accordance with the present invention enables one expensive high tension primary coil with its simple, long, one-turn secondary and heavy interleaved bus bars, to be utilized for many different sizes of pipes, it being only necessary to change the relatively simple and inexpensive tertiary coil as required for the particular diameter being welded. It also enables the primary and secondary to be made more liberal in dimensions, especially where such primary must operate on fairly high voltages; and with such relationship one to the other as to secure the most efficient results from the standpoint of close coupling, magnetically, of these two coils. The tertiary coil being much shorter axially than the above, will tend to give excessive magnetic leakage effects, were it not that because of its single turn, and low voltage construction, it can be brought far closer to the tube surface in general than would be possible with any insulated high voltage coil. Moreover, such a coil on account of its multi-turn construction must carry its turns right across the highly heated seam, whereas the horseshoe type of single turn coil does not. With a tertiary coil of the general construction, for example, as illustrated in perspective in Figure 2 of the drawings, which general type of construction is characteristic of many forms of the invention, either the secondary coil or the tertiary coil, since they each comprise a single turn, may be expanded or contracted so as to more accurately conform with the material being welded, while still making it possible to maintain the electric connections originally established.

The reduction of the magnetic leakage in the air-space between the outer layers of a single turn coil and the tube greatly increases the possible input to the tube per unit of axial length of the coil. A greater welding speed and tonnage output are thus possible and an inducing coil of shorter axial length may be employed.

It will be furthermore apparent to those skilled in the art, that any of the above types of single turn cylindrical inducing coil will give far less total copper magnetic leakage than the customary multi-turn inducing coils operating on high voltages, since the latter contain much insulation which has to be safe-guarded by holding the temperature within moderate limits, such that the coils cannot be operated at excessive current densities, as can the bare metal single turn coils. This means that the copper leakage space is much smaller in such single turn coils, and also that the average distance of the current carrying parts from the tube may be made much less. Both of these factors tend to accentuate the possible output from the single turn inducing coil, for giving physical dimensions of the latter, as compared with any multi-turn coil. This tends also toward materially increased welding speeds and greater tonnage output of welded product.

The cylindrical, single-turn coil, can be made much shorter axially than the usual primary high voltage coil, for the reasons stated, and this leads at once to permissible welding much closer to the ends of each tube than has heretofore been possible, with a consequent reduction in end scrap loss.

Since the radially opposed points of the tertiary and of the material are of substantially the same voltage when the tertiary coil is disposed in such manner that the space between its ends is in substantially radial alignment with the space between the edges of the material, the apparatus may be operated much more safely, since the possibility of burning by reason of contact between parts at different voltages is minimized. This again permits such coil to be operated safely much closer to the tube than is possible with any multi-turn, high voltage inducing coil. It is also safer for the reason that the maximum voltage within the heating zone may be reduced to about 15 to 20 volts as distinguished from a voltage of 400 to 800 volts, such as is ordinarily impressed on a primary coil when located in the heating zone.

Furthermore, since the bar metal, thin cylindrical single-turn type of coil has much less radial depth than the usual forms of wound coil, such single-turn coil when used within a tube, as shown in Figure 5, for example, will leave far more available area for the laminated core, than will the usual types of coils heretofore used. This is of the utmost importance when an attempt is made to weld smaller and smaller sizes of tubes. Such a single-turn, cylindrical coil will be found to permit a sufficient core diameter to give the necessary flash heating voltage, when used with one or two sizes smaller pipe than can be taken care of by the usual coils.

Furthermore, the greatly lowered voltage gives a far safer coil to operate under extreme high temperature conditions, as will be obvious, and in addition to this, the open sided cylindrical coil has no current carrying parts immediately under the hot seam, whereas all multi-turn coils of necessity are open to this objection.

Because the current flow path around the cylinder can shift axially more or less, so as to follow the general course of the pipe current, the single-turn coil gives an ultra low leakage reactance, and therefore an ultra high energy input, as compared with any multi-turn coil in which the current of necessity must follow the course of the individual turns.

Inasmuch as the tertiary coil may be made of bare metal, insulating problems are eliminated as to the coil structure itself, while due to the approximate equality of point to point or fractional voltages around the periphery of the tertiary coil and the periphery of the material, it is not necessary to provide insulation between these parts.

As the axial length of the tertiary coil may be increased or diminished at will, irrespective of the minimum length of the primary coil, and therefore of the secondary, any desired energy concentration may be obtained in the welding zone. This, together with the characteristics of the tertiary coil as hereinbefore described make possible an energy transfer from the tertiary coil to the material which is higher per unit length of material than has heretofore been obtainable in a practical apparatus.

Still further advantages arise from the construction of the general character referred to since the tertiary, even though kept as a single turn coil, is adapted to be fed either from a single turn secondary coil, or a multi-turn secondary coil as illustrated and described.

Many other advantages will be apparent to those skilled in the art from an understanding of the invention as imparted by the foregoing description and the drawings. Such an understanding will further make it apparent that many changes in the type of apparatus employed as well as the construction and method of operating the same may be made without departing either from the spirit of the invention or the scope of my broader claims.

I claim:

1. In a welding apparatus providing an induction heating zone, a tertiary coil having its coil axis substantially parallel to the proposed line of weld for inducing a heating current in said zone, and means outside of said zone for supplying current to said coil, said means including a welding transformer in substantially concentric relationship to said coil but spaced axially therefrom.

2. In a heating apparatus, a transformer including a primary and secondary, and a tertiary coil electrically connected to said secondary and maintained in an inductive relation to the material being heated, said tertiary coil having a single turn, disposed in flatwise relationship to the material being heated.

3. In a heating apparatus, a welding transformer in current inducing relationship to the material being heated for preheating same, and a tertiary coil energized by said transformer and in closely adjacent current inducing relationship to said material for effecting further heating thereof.

4. In a tube welding apparatus, the combination with means for advancing a formed tube blank having an axial seam cleft, and means for progressively closing the cleft, of an inducing coil adjacent the point of cleft closure and disposed coaxially of the blank, comprising a plate bent substantially to C-shape with the spaced edges adjacent the seam cleft, means for supplying current to said coil, comprising a transformer spaced therefrom having a secondary winding similar thereto and relatively short direct connections between said coil and secondary winding.

5. In a tube welding apparatus, the combination with means for advancing a formed tube blank having an axial seam cleft, and means for progressively closing the cleft, of an inducing coil adjacent the point of cleft closure and disposed coaxially of the blank, comprising a single turn of conducting material, a transformer for energizing said coil, said transformer being adjacent the coil but spaced a short distance therefrom, and connections between said transformer and coil.

6. In a tube welding apparatus, the combination with means for feeding a formed tube blank having an axial seam cleft, and means for progressively closing the cleft, of a low-voltage, heavy-current inducing coil adapted to be traversed by the blank, said coil comprising a single turn of conducting material extended along the axis of the blank, and a step-down power transformer adjacent said coil for supplying current thereto.

7. In a tube welding apparatus, the combination with means for advancing a formed tube blank having an axial seam cleft, and means for progressively closing the cleft, of an inducing coil supported adjacent the point of cleft closure, said coil comprising a plate of conducting material bent to substantially C-shape, the abutting edges of said bent plate being flattened to space them from adjacent portions of the blank, and a transformer adjacent the coil for supplying inducing current thereto.

8. In a tube welding apparatus, the combination with means for advancing a formed tube blank having an axial seam cleft, and means for progressively closing the cleft, of an inducing coil adjacent the point of cleft closure, said coil comprising a single turn of conducting material extended axially of the blank, and a transformer coaxial with the coil for supplying current thereto but spaced therefrom along the axis of the blank.

9. In a tube welding apparatus, the combination with means for advancing a formed tube blank having an axial seam cleft, and means for progressively closing the cleft, of an inducing coil adjacent the point of cleft closure, said coil comprising a split expansible cylinder of bare conducting material, and a transformer adjacent the coil for supplying energy thereto, the secondary of the transformer being connected to the edges of said split cylinder.

10. In a tube welding apparatus, the combination with means for advancing a formed tube blank having an axial seam cleft, and means for progressively closing the cleft, of an inducing coil adjacent the point of cleft closure, said coil comprising a single turn of conducting material extended axially of the blank, and a transformer for supplying current thereto disposed laterally of said coil having, a secondary winding and short, direct connections between said secondary and said coil.

11. In a tube welding apparatus, the combination with means for advancing a formed tube blank having an axial seam cleft, and means for progressively closing the cleft, of an inducing coil adjacent the point of cleft closure, said coil comprising a single turn of conducting material extended axially of the blank, and a transformer for supplying current thereto disposed substantially concentric to said coil, having a secondary winding and short, direct connections between said winding and said coil.

12. In a tube welding apparatus, the combination with means for advancing a formed tube blank having an axial seam cleft, and means for progressively closing the cleft, of an inducing coil adjacent the point of cleft closure adapted to be surrounded by the blank in its forward movement and comprising a single turn of conducting material extending a substantial distance along the axis of the blank, and a transformer adjacent the coil having a secondry winding connected thereto for supplying inducing current to the coil.

13. In a tube welding apparatus, the combination with means for advancing a formed tube blank having an axial seam cleft, and means for progressively closing the cleft, of an inducing coil adjacent the point of cleft closure adapted to surround the blank in its forward movement and comprising a single turn of conducting material extending a substantial distance along the axis of the blank, and a transformer adjacent the coil having a secondary winding connected thereto for supplying inducing current to the coil.

14. In a tube welding apparatus, the combination with means for advancing a formed tube blank having an axial seam cleft, and means for progressively closing the cleft, of an inducing coil adjacent the point of cleft closure, said coil comprising a conducting plate bent to conform to the shape of the tube with its edges in spaced relation, and a transformer for supplying energy to said coil having a secondary winding connected to said edges.

15. In a tube welding apparatus, the combination with means for advancing a formed tube blank having an axial seam cleft, and means for progressively closing the cleft, of an inducing coil adjacent the point of cleft closure, said coil comprising a single turn of conducting material, the ends of the turn being in spaced relation, and a transformer having a secondary winding connected to said ends.

16. In a tube welding apparatus, the combination with means for advancing a formed tube blank having an axial seam cleft, and means for progressively closing the cleft, of an inducing coil adjacent the point of cleft closure, said coil comprising an expansible split cylinder of conducting material, and a transformer for supplying energy to said coil having a secondary winding of similar characteristics connected thereto.

17. Apparatus for inducing circumferential welding currents in a tube blank having an axial seam cleft, comprising a single turn C-shape induction coil, means for supporting said coil coaxial with the blank and in electromagnetic relation to the latter with the spaced ends of the coil adjacent the edges of the seam cleft, a source of low-voltage periodically varying current for said coil, and direct connections between the source and the coil.

18. Apparatus for inducing circumferential welding currents in a formed tube blank having an axial seam cleft, comprising a thin conducting plate bent to conform substantially to the contour of the blank, means for supporting the bent plate coaxially of the blank in electromagnetic relation and close physical proximity to the blank, and large capacity, low-voltage, current supply means connected to the adjacent edges of said plate.

19. Apparatus for inducing circumferential welding currents in a formed tube blank having an axial seam cleft, comprising a split, cylindrical, single-turn inducing coil supported in electromagnetic relation with said blank, a source of periodically varying current connected to the adjacent edges of said split cylinder, and guiding means projecting through said cylinder to engage the edges of said seam cleft.

20. In an induction tube welding apparatus, means for feeding a formed tube blank, a coil for inducing circumferential welding current in said blank, said coil comprising a single turn of conducting material having a substantial width, a transformer for energizing said coil having a large capacity secondary winding and a high voltage primary winding, and large capacity connections between said coil and said secondary winding.

JAMES L. ADAMS, JR.

CERTIFICATE OF CORRECTION.

Patent No. 1,948,154.　　　　　　　　　　　February 20, 1934.

JAMES L. ADAMS, JR.

It is hereby certified that error appears in the printed specification of the above numbered patent requiring correction as follows: Page 1, line 102, after "current" insert the words which crosses the seam near, and at the welding position; page 2, line 100, for "long" read short; page 3, line 6, before "tertiary" insert the word inside and line 7, strike out the word "inside"; page 4, line 56, strike out the word "herein"; same page, line 92, for "Figure 12" read Figure 13; and that the said Letters Patent should be read with these corrections therein that the same may conform to the record of the case in the Patent Office.

Signed and sealed this 3rd day of April, A. D. 1934.

F. M. Hopkins (Seal)　　　　　　　　　　　　　　　　Acting Commissioner of Patents.